United States Patent
Sasaki et al.

(10) Patent No.: US 8,000,673 B2
(45) Date of Patent: Aug. 16, 2011

(54) DIVERSITY RECEIVING DEVICE AND RECEIVING SCHEME SWITCHING METHOD

(75) Inventors: Makoto Sasaki, Kanagawa (JP); Yasumi Imagawa, Ishikawa (JP); Satoshi Kaga, Ishikawa (JP); Kazuhiko Nakayama, Ishikawa (JP); Keiko Izumi, Ishikawa (JP)

(73) Assignee: Panasonic Corporation, Osaka (JP)

( * ) Notice: Subject to any disclaimer, the term of this patent is extended or adjusted under 35 U.S.C. 154(b) by 521 days.

(21) Appl. No.: 12/295,200

(22) PCT Filed: Apr. 4, 2006

(86) PCT No.: PCT/JP2006/307112
§ 371 (c)(1),
(2), (4) Date: Sep. 29, 2008

(87) PCT Pub. No.: WO2007/113902
PCT Pub. Date: Oct. 11, 2007

(65) Prior Publication Data
US 2009/0191831 A1 Jul. 30, 2009

(51) Int. Cl.
*H04B 1/06* (2006.01)
(52) U.S. Cl. .............. 455/272; 455/552.1; 455/553.1; 455/422.1; 455/39; 370/338
(58) Field of Classification Search .............. 455/272, 455/552.1, 553.1, 422.1, 39; 370/338
See application file for complete search history.

(56) References Cited

U.S. PATENT DOCUMENTS

| | | | | |
|---|---|---|---|---|
| 6,571,103 B1 * | 5/2003 | Novakov | | 455/464 |
| 6,941,156 B2 * | 9/2005 | Mooney | | 455/553.1 |
| 7,295,860 B2 * | 11/2007 | Suwa | | 455/552.1 |

FOREIGN PATENT DOCUMENTS

| | | | |
|---|---|---|---|
| JP | 2003-037547 A | 2/2003 |
| JP | 2003-174389 A | 6/2003 |
| JP | 2004-297281 A | 10/2004 |
| JP | 2004-320528 A | 11/2004 |
| JP | 2006-041635 A | 2/2006 |

OTHER PUBLICATIONS

International Search Report.

* cited by examiner

*Primary Examiner* — Sand D Phu
(74) *Attorney, Agent, or Firm* — Pearne & Gordon LLP

(57) ABSTRACT

It is a theme of the present invention to provide a diversity receiving device and a receiving scheme switching method, capable of attaining a power saving by executing a switching between a diversity reception and a single reception with high accuracy. A receiving scheme switching portion (112) switches a receiving mode between a single reception and a diversity reception based on a receiving scheme switching threshold, updates the receiving scheme switching threshold based on the receiving rate calculated by a receiving rate calculating portion (110), switches the receiving mode into the single reception in which respective ones of antennas (101, 105), radio demodulating portions (102, 106), and decoding portions (103, 107) are employed respectively and also turns OFF respective power supplies of the remaining antenna (101 or 105), the remaining radio demodulating portion (102 or 106), and the remaining decoding portion (103 or 107) when the received quality calculated by the received quality calculating portion (111) exceeds the receiving scheme switching threshold, and switches the receiving mode into the diversity reception in which the antennas, the radio demodulating portions, and the decoding portions are employed in both branches when the received quality is below the receiving scheme switching threshold.

7 Claims, 4 Drawing Sheets

DIVERSITY RECEIVING DEVICE AND RECEIVING SCHEME SWITCHING METHOD

TECHNICAL FIELD

The preset invention relates to a diversity receiving device and a receiving scheme switching method.

BACKGROUND ART

In the prior art, the diversity receiving device for implementing an improvement of receiving quality by providing a plurality of receiving branches has been proposed (see Patent Literature 1, for example). The diversity receiving device disclosed in Patent Literature 1 at first chooses any one of two receiving branches and executes an error detection of information signal, and continues at the reception through this branch and turns OFF a power feed to the other receiving branch when no error is detected from the information signal (single receiving mode 1). Then, when the receiving environments are changed in the single receiving mode 1 because of transit, or the like and an error rate of the information signal exceeds a predetermined value, an effective range of the information signal is expanded by restarting a power feed to the other receiving branch and switching the receiving mode from the single receiving mode 1 to the diversity receiving mode.

In the diversity receiving mode, the received quality is detected by a square error of the information signal, the square error is compared with a predetermined threshold. Then, when the receiving environments are changed because of transit, or the like and the square error becomes smaller than the threshold, it is decided that the receiving environments are improved, and the receiving mode is shifted to the single receiving mode 1. Also, in the diversity receiving mode, an error detection of a control signal is carried out to measure an error rate of the control signal. Then, when the receiving environments are changed because of transit, or the like and the error rate exceeds a predetermined value, it is decided that the normal reception of the information signal cannot be carried on. Thus, the playback of the information signal is stopped and also the receiving mode is shifted from the diversity receiving mode to a single receiving mode 2.

In the single receiving mode 2, the diversity receiving device chooses any one of two receiving branches and makes an error detection of the control signal continuously. At this time, the diversity receiving device turns OFF a power feed to the other receiving branch. Then, in the single receiving mode 2, when the receiving environments are changed because of transit, or the like and the error rate of the control signal becomes smaller than a predetermined value, it is decided that the quality of the received signal is improved. Thus, a power feed to the other receiving branch is restarted and the receiving mode is shifted from the single receiving mode 2 to the diversity receiving mode.

Patent Literature 1: JP-A-2004-320528

DISCLOSURE OF THE INVENTION

Problems that the Invention is to Solve

However, the conventional diversity receiving device makes a switching decision between the diversity reception and the single reception based on a fixed value (a "threshold", a "previously set value"). Therefore, sometimes this diversity receiving device executes the single reception irrespective of the receiving environments that need the diversity reception, so that a diversity function cannot be fully used. Conversely, sometimes this diversity receiving device executes the diversity reception even though the single reception will suffice. As a result, it is impossible to say that this diversity receiving device is enough to attain an advanced power saving. In particular, since a miniaturized battery is used in a small-sized electronic equipment such as a cellular phone, or the like, a time duration of the battery cannot be prolonged when a wasteful power is consumed. From the above reasons; a further power saving is expected now.

The present invention has been made in view of such circumstances, and it is an object of the present invention to provide a diversity receiving device and a receiving scheme switching method, capable of executing a switching between a diversity reception and a single reception with high accuracy.

Means for Solving the Problems

The above object can be achieved by configurations and method described as follows.

A diversity receiving device of the present invention includes a plurality of antennas for receiving a radio signal respectively; a plurality of radio demodulating portions for demodulating each of radio signals received by the plurality of antennas respectively; a plurality of decoding portions for decoding output signals from the plurality of radio demodulating portions respectively; a synthesizing portion for synthesizing output signals from the plurality of decoding portions; a power-supply controlling portion for applying an ON/OFF-control to respective power supplies of the plurality of radio demodulating portions, the plurality of decoding portions, and the synthesizing portion respectively; a receiving rate calculating portion for calculating a receiving rate from an output signal of the synthesizing portion; a received quality calculating portion for calculating a received quality based on respective output signals of the plurality of decoding portions or the output signal of the synthesizing portion; and a receiving scheme switching portion for switching a receiving mode between a single reception and a diversity reception based on a receiving scheme switching threshold, updating the receiving scheme switching threshold based on, the receiving rate calculated by the receiving rate calculating portion, switching the receiving mode into the single reception in which ones portion of the plurality of antennas, one portion of the plurality of radio demodulating portions, and one portion of the plurality of decoding portions are employed respectively and turning OFF respective power supplies of remaining antennas, remaining radio demodulating portions, and remaining decoding portions when the received quality calculated by the received quality calculating portion exceeds the receiving scheme switching threshold, and switching the receiving mode into the diversity reception in which the plurality of antennas, the plurality of radio demodulating portions, and the plurality of decoding portions are employed respectively when the received quality is below the receiving scheme switching threshold.

The receiving scheme switching portion sets the receiving scheme switching threshold smaller by a predetermined value when the receiving rate calculated by the receiving rate calculating portion is equal to or greater than a reference receiving rate set previously, and sets the receiving scheme switching threshold larger by a predetermined value when the receiving rate calculated by the receiving rate calculating portion is smaller than the reference receiving rate.

The receiving scheme switching portion has a first predetermined value that is less than the receiving scheme switching threshold and a second predetermined value that is more than the receiving scheme switching threshold, and the receiving scheme switching portion sets the receiving scheme switching threshold larger by a predetermined value and switches the receiving mode to the single reception when the received quality calculated by the received quality calculating portion is equal to or greater than the receiving scheme switching threshold and the receiving scheme switching threshold is equal to or smaller than the first predetermined value, switches the receiving mode to the single reception when the received quality calculated by the received quality calculating portion is equal to or greater than the receiving scheme switching threshold and the receiving scheme switching threshold is greater than the first predetermined value, sets the receiving scheme switching threshold smaller by the predetermined value and switches the receiving mode to the single reception when the received quality calculated by the received quality calculating portion is smaller than the receiving scheme switching threshold and the receiving scheme switching threshold is equal to or greater than the second predetermined value, and switches the receiving mode to the diversity reception when the received quality calculated by the received quality calculating portion is smaller than the receiving scheme switching threshold and the receiving scheme switching threshold is smaller than the second predetermined value.

The receiving scheme switching portion has a first predetermined value that is less than the receiving scheme switching threshold and a second predetermined value that is more than the receiving scheme switching threshold, and the receiving scheme switching portion sets the receiving scheme switching threshold larger by a predetermined value and switches the receiving mode to the single reception when the received quality calculated by the received quality calculating portion is equal to or greater than the receiving scheme switching threshold and the receiving scheme switching threshold is equal to or smaller than the first predetermined value, and sets the receiving scheme switching threshold smaller by the predetermined value and switches the receiving mode to either the diversity reception to execute a diversity intermittent reception such that the diversity reception is executed only at a predetermined time interval or the single reception to execute a single intermittent reception such that the single reception is executed only at the predetermined time interval when the received quality calculated by the received quality calculating portion is smaller than the receiving scheme switching threshold and the receiving scheme switching threshold is equal to or greater than the second predetermined value.

The received quality calculating portion calculates C/N as a power ratio of a signal to a noise or a received field strength as the received quality.

A mobile terminal of the present invention is equipped with the diversity receiving device set forth in any one of the above.

A receiving scheme switching method of the present invention of executing a switching between a single reception and a diversity reception in a diversity receiving device, which includes a plurality of antennas for receiving a radio signal respectively, a plurality of radio demodulating portions for demodulating each of radio signals received by the plurality of antennas respectively, a plurality of decoding portions for decoding respective output signals from the plurality of radio demodulating portions, a synthesizing portion for synthesizing output signals from the plurality of decoding portions respectively, a power-supply controlling portion for applying an ON/OFF-control to respective power supplies of the plurality of radio demodulating portions, the plurality of decoding portions, and the synthesizing portion respectively, a receiving rate calculating portion for calculating a receiving rate from an output signal of the synthesizing portion, and a received quality calculating portion for calculating a received quality based on respective output signals of the plurality of decoding portions or the output signal of the synthesizing portion, the switching method, includes the processes of switching the receiving mode between the single reception and a diversity reception based on a receiving scheme switching threshold; updating the receiving scheme switching threshold based on the receiving rate calculated by the receiving rate calculating portion; switching the receiving mode into the single reception in which one portion of the plurality of antennas, one portion of the plurality of radio demodulating portions, and one portion of the plurality of decoding portions are employed respectively and turning OFF respective power supplies of remaining antennas, remaining radio demodulating portions, and remaining decoding portions when the received quality calculated by the received quality calculating portion is equal to or greater than the receiving scheme switching threshold; and switching the receiving mode into the diversity reception in which the plurality of antennas, the plurality of radio demodulating portions, and the plurality of decoding portions are employed respectively when the received quality is smaller than the receiving scheme switching threshold.

Advantages of the Invention

The diversity receiving device of the present invention updates the threshold value serving as the criterion to decide whether or not the diversity reception should be started, in response to a receiving rate. Therefore, a switching accuracy between the diversity reception and the single reception can be improved, and thus a power saving can be achieved, so that a time duration of the battery can be prolonged when this diversity receiving device is applied to a small-sized electronic equipment such as a cellular phone, or the like.

Figure 1:
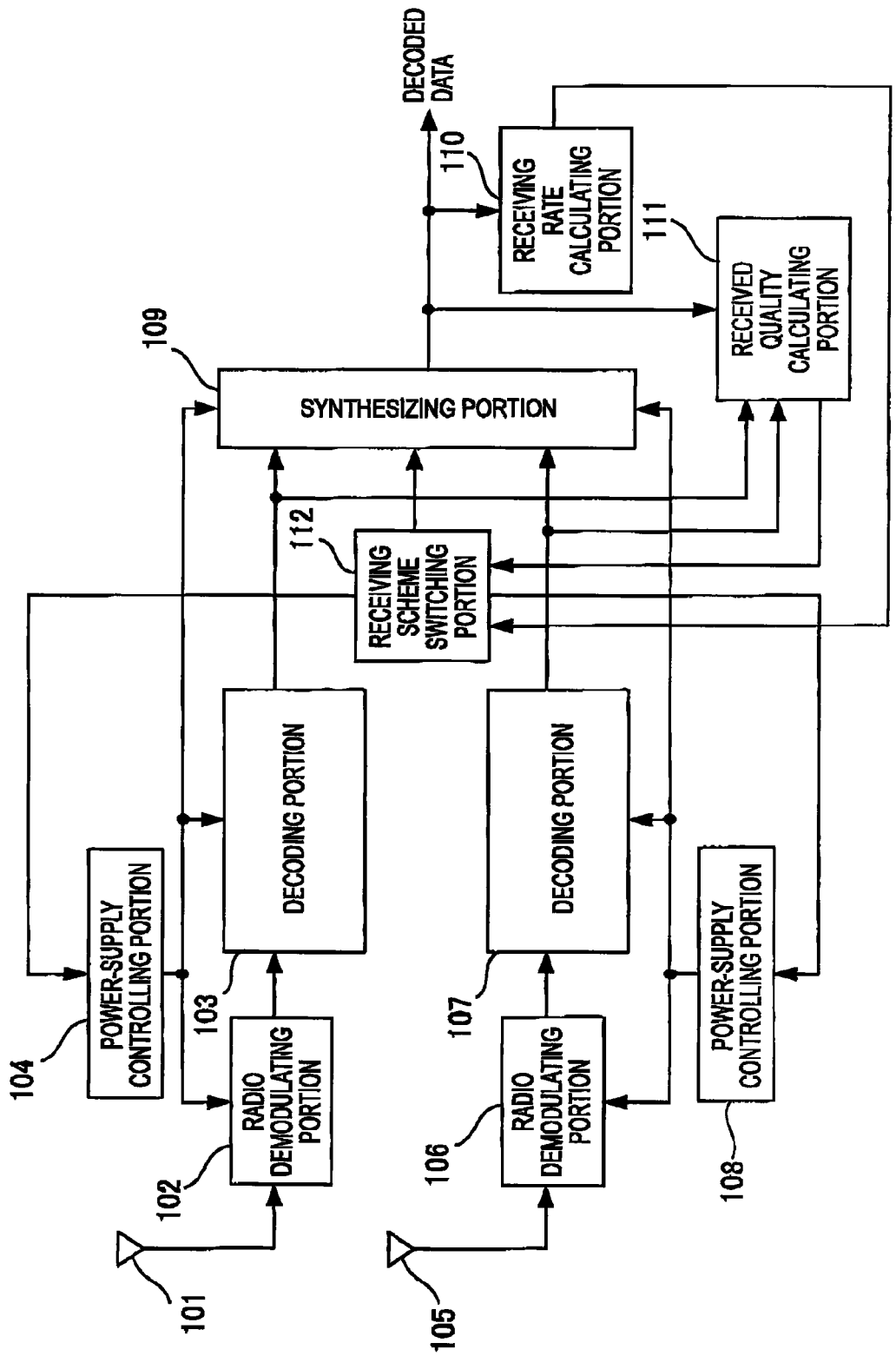
FIG. 1 is a block diagram showing a schematic configuration of a diversity receiving device according to Embodiment 1 of the present invention.

DESCRIPTION OF REFERENCE NUMERALS 101, 105 antenna
102, 106 radio demodulating portion
103, 107 decoding portion
104, 108 power-supply controlling portion
109 synthesizing portion
110 receiving rate calculating portion 111 received quality calculating portion
112 receiving scheme switching portion

BEST MODE FOR CARRYING OUT THE INVENTION

Preferred embodiments for carrying out the present invention will be explained in detail with reference to the drawings hereinafter.

FIG. 1 is a block diagram showing a schematic configuration of a diversity receiving device according to Embodiment 1 of the present invention. In FIG. 1, the diversity receiving device of the present embodiment can be used in receiving the digital terrestrial broadcasting, for example. This diversity receiving device is constructed to have antennas 101 and 105 for getting a radio signal respectively, a radio demodulating portion 102 for demodulating the radio signal received by the antenna 101, a radio demodulating portion 106 for demodulating the radio signal received by the antenna 105, a decoding portion 103 for decoding the signal that is demodulated by the radio demodulating portion 102, a decoding portion 107 for decoding the signal that is demodulated by the radio demodulating portion 106, a synthesizing portion 109 for synthesizing the signals that are decoded by the decoding portions 103, 107, a receiving rate calculating portion 110 for calculating a receiving rate of the synthesized signal from the synthesizing portion 109, a received quality calculating portion 111 for calculating a received quality based on the decoded signal before the synthesis and the decoded signal after the synthesis, a receiving scheme switching portion 112 for switching a receiving scheme based on the receiving rate and the received quality, a power-supply controlling portion 104 for applying a power-supply ON/OFF control to the radio demodulating portion 102, the decoding portion 103, and the synthesizing portion 109 respectively under control of the receiving scheme switching portion 112, and a power-supply controlling portion 108 for applying a power-supply ON/OFF control to the radio demodulating portion 106, the decoding portion 107, and the synthesizing portion 109 respectively under control of the receiving scheme switching portion 112.

As the synthesizing method in the synthesizing portion 1091 the method having the great synthesizing effect is desirable. For example, in the case of the OFDM (Orthogonal Frequency Division Multiplexing) modulation scheme, there is the carrier synthesizing method, and the like. The receiving rate calculating portion 110 calculates a receiving rate from the synthesized signal. For example, a receiving rate [%] obtained when a packet error rate (PER) is used as the received quality can be calculated by Equation (1).

[Formula 1]

$$\text{Receiving rate} = [\int \{1 - \text{PER}(t)\} dt] * 100 \quad (1)$$

The received quality calculating portion 111 calculates C/N [dB] as a power ratio of a signal to a noise as the received quality. In this case, as the measure of the received quality, a received filed strength [dBm], a bit error rate (BER) [%], and the like may be calculated, in addition to the above packet error rate [%]. The power-supply controlling portion 104 applies a power-supply ON control to the radio demodulating portion 102, the decoding portion 103, and the synthesizing portion 109 respectively when the operation command is issued from the receiving scheme switching portion 112, and also applies a power-supply OFF control to the radio demodulating portion 102, the decoding portion 103, and the synthesizing portion 109 respectively when no operation command is issued. The power-supply controlling portion 108 applies a power-supply ON control to the radio demodulating portion 106, the decoding portion 107, and the synthesizing portion 109 respectively when the operation command is issued from the receiving scheme switching portion 112, and also applies a power-supply OFF control to the radio demodulating portion 106, the decoding portion 107, and the synthesizing portion 109 respectively when no operation command is issued. The synthesizing portion 109 does not execute the synthesizing process when the power-supply OFF control is applied from either of the power-supply controlling portion 104 and the power-supply controlling portion 108, and outputs the decoded signal being input from either of the decoding portion 103 and the decoding portion 107 as it is.

Next, an operation of the diversity receiving device constructed as above will be explained hereunder. First, when a power supply is turned ON and then the diversity receiving device starts an operation, the radio signals received by the antennas 101 and 105 are input into the radio demodulating portions 102 and 106, and are demodulated there respectively. Then, the demodulated signals output from the radio demodulating portions 102 and 106 are input into the decoding portions 103 and 107, and are decoded there respectively. The decoded data output from the decoding portions 103 and 107 are synthesized by the synthesizing portion 109 and are output, and also the output decoded data are input into the receiving rate calculating portion 110 and the received quality calculating portion 111 respectively.

The decoded data output from the decoding portions 103 and 107 are also input into the received quality calculating portion 111, and the received quality is calculated from these decoded data and the decoded data from the synthesizing portion 109. Then, the calculated received quality is input into the receiving scheme switching portion 112. The receiving rate is calculated when the decoded data is input to the receiving rate calculating portion 110 from the synthesizing portion 109, and then the calculated receiving rate is input into the receiving scheme switching portion 112. In the receiving scheme switching portion 112, the process is executed in compliance with a flowchart shown in FIG. 2. An operation of the receiving scheme switching portion 112 will be explained with reference to a flowchart shown in FIG. 2 and a view showing a relationship between C/N and β hereunder.

Figure 2:
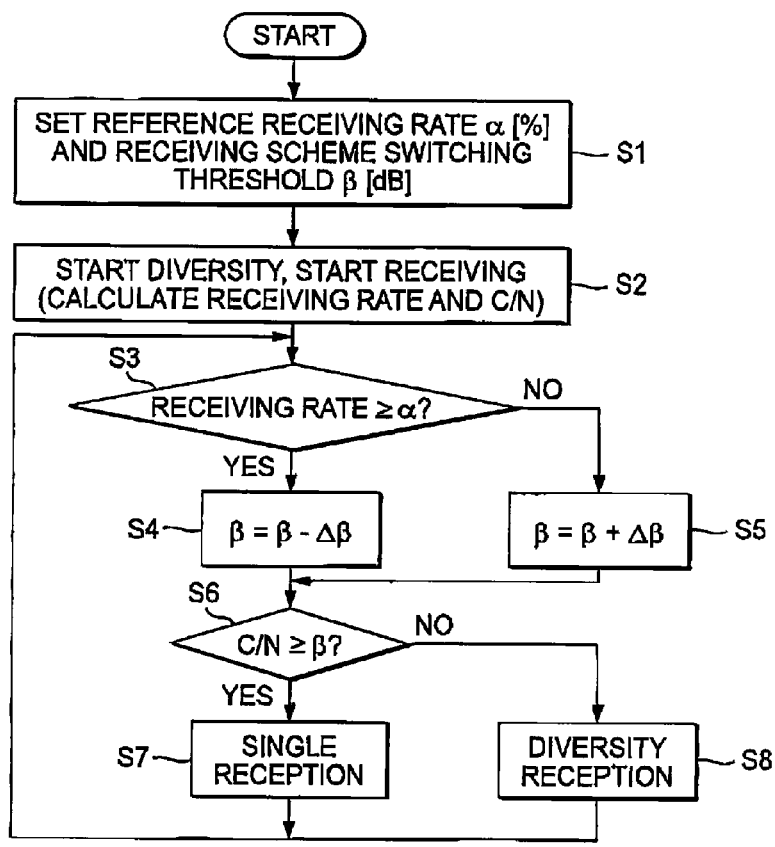
FIG. 2 is a flowchart explaining an operation of the diversity receiving device according to Embodiment 1 of the present invention.
Figure 2:
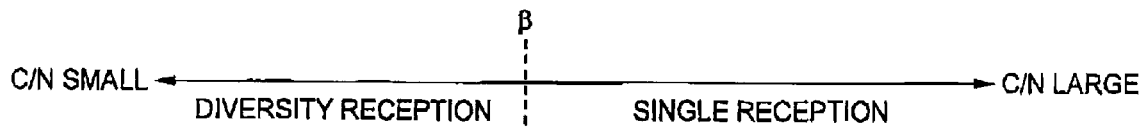

In FIG. 2, first a desired receiving rate α [%] as a reference and an initial value of a receiving scheme switching threshold β [dB] are set (step S1). Here, assume that a β is C/N. In this case, in addition to C/N, any parameter such a BER, PER, or the like may be employed if the parameter can indicate the received quality. Then, after the initial value of a receiving scheme switching threshold β and the reference receiving rate α are set respectively, the diversity reception is started and the receiving rate & C/N are calculated (step S2). Then, it is decided whether or not the calculated receiving rate is in excess of a desired receiving rate α (step S3). If the calculated receiving rate exceeds the desired receiving rate α, the received quality can be ensured satisfactorily. Therefore, the threshold β is set lower by Δβ (step S4), and the diversity reception is hard to start. That is, a time of the diversity reception is set to become shorter. In contrast, if the calculated receiving rate is below the desired receiving rate α, the received quality cannot be ensured. Therefore, the threshold β is set higher by Δβ (step S5), and diversity reception is ready to start. That is, a time of the diversity reception is set to become longer.

After the receiving scheme switching threshold β is updated by setting this value lower or higher by Δβ, it is decided whether or not C/N is in excess of β, by comparing C/N calculated in step S2 with β (step S6). If C/N is in excess of β, the single reception is carried out (step S7). In contrast, if C/N is below $\beta$, the diversity reception is carried out (step S8). With this arrangement, the diversity reception is carried out only when the received quality cannot be ensured satisfactorily, i.e., the received quality is inadequate. Therefore, a switching accuracy between the diversity reception and the single reception can be improved, and a rate of execution of the diversity reception is reduced. As a result, a power saving can be achieved, and a time duration of the battery can be prolonged when this diversity receiving device is applied to the small-sized electronic equipment such as the cellular phone, or the like.

In this manner, according to the diversity receiving device of the present embodiment, the threshold $\beta$ is set lower by $\Delta\beta$ if the receiving rate calculated by the receiving rate calculating portion 110 is more than the receiving rate set value $\alpha$ set previously, while the threshold $\beta$ is set higher by $\Delta\beta$ if the calculated receiving rate is below the receiving rate set value $\alpha$. Subsequent to this update of $\beta$, the single reception, i.e., the reception through either of the receiving branch consisting of the antenna 101, the radio demodulating portion 102, and the decoding portion 103 and the receiving branch consisting of the antenna 105, the radio demodulating portion 106, and the decoding portion 107, is carried out if the calculated received quality is more than the updated $\beta$, while the diversity reception, i.e., the receptions through both the receiving branch consisting of the antenna 101, the radio demodulating portion 102, and the decoding portion 103 and the receiving branch consisting of the antenna 105, the radio demodulating portion 106, and the decoding portion 107, is carried out if the calculated received quality is below the updated $\beta$. Therefore, a switching accuracy between the diversity reception and the single reception can be improved, and a rate of execution of the diversity reception is reduced. As a result, a power saving can be achieved, and a time duration of the battery can be prolonged when this diversity receiving device is applied to the small-sized electronic equipment such as the cellular phone, or the like. In this case, BER, PER, or the like can be used as the measure of the received quality. In such case, setting of the threshold is made in the opposite way to the above explanation. That is, the threshold may be set higher when a value of BER (PER) is increased whereas the threshold may be set lower when a value of BER (PER) is decreased.

Figure 3:
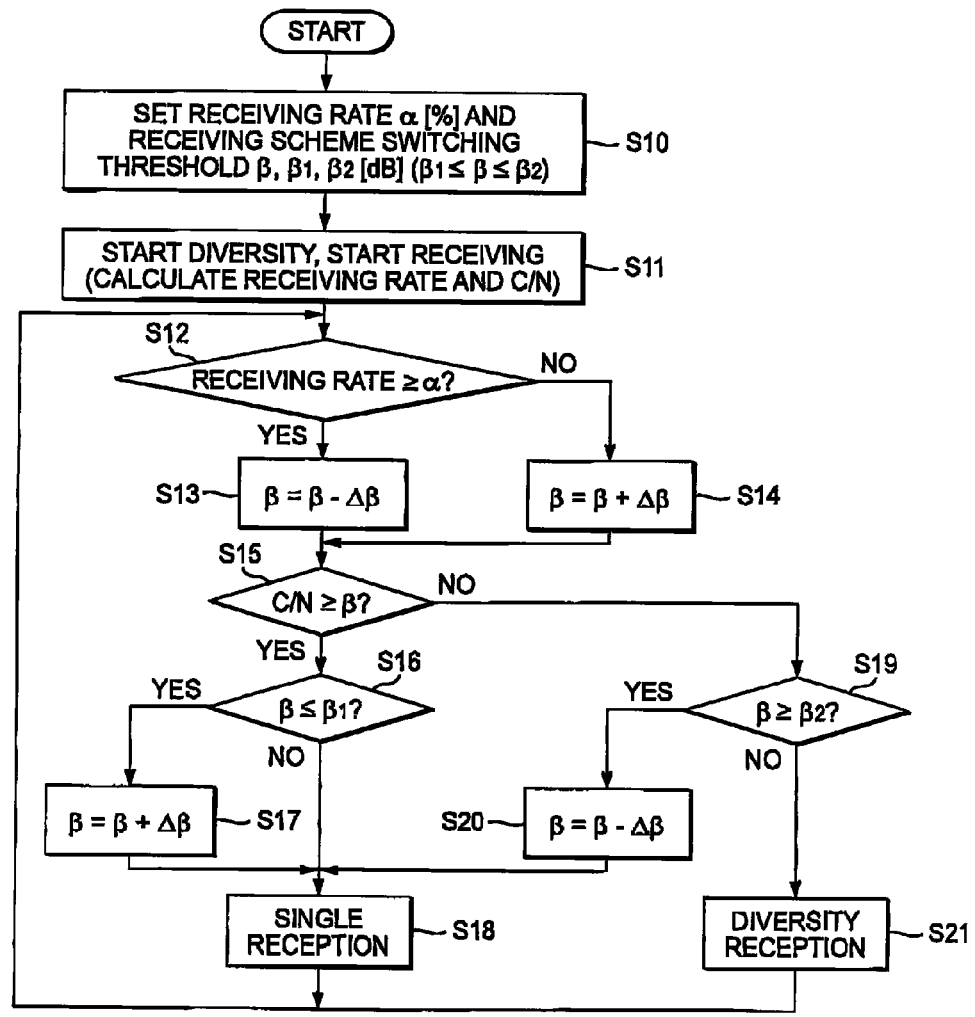
FIG. 3 is a flowchart explaining an operation of a diversity receiving device according to Embodiment 2 of the present invention.
Figure 3:
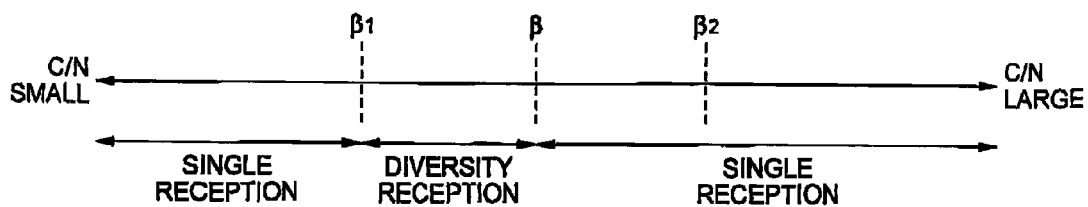

Next, a diversity receiving device according to Embodiment 2 of the present invention will be explained hereunder. The diversity receiving device of the present embodiment is different from Embodiment 1 in that a minimum value (first predetermined value) $\beta 1$ and a maximum value (second predetermined value) $\beta 2$ are provided to the receiving scheme switching threshold $\beta$ such that $\beta 1 \leq \beta \leq \beta 2$. The configuration of the receiver is similar to that in FIG. 1, and therefore its explanation will be omitted herein. An operation of the diversity receiving device of the present embodiment will be explained with reference to a flowchart shown in FIG. 3 and a view showing a relationship between C/N and $\beta$, $\beta 1$, $\beta 2$. Since processes of updating the value $\beta$ (step S11 to step S14) except the setting process of the receiving rate $\alpha$ and the setting process of the receiving scheme switching thresholds $\beta$, $\beta 1$, $\beta 2$ are similar to those in Embodiment 1, their explanation will be omitted herein.

After the receiving scheme switching threshold $\beta$ is updated by setting this value lower or higher by $\Delta\beta$, it is decided whether or not C/N is in excess of 13, by comparing C/N calculated in step S11 with $\beta$ (step S15). If C/N is in excess of $\beta$, it is decided whether or not $\beta$ is less than $\beta 1$ (step S16). If $\beta$ is less than $\beta 1$, the threshold $\beta$ is set higher by $\Delta\beta$ (step S17). Then, the single reception is carried out (step S18).

In contrast, if $\beta$ is more than $\beta 1$, the single receiving operation is executed as it is (step S18). In this manner, it is set that the single receiving operation is executed when C/N is in excess of $\beta$ and $\beta$ is more than $\beta 1$, while it, is set that the threshold $\beta$ is set higher by $\Delta\beta$ and the single receiving operation is executed when C/N is in excess of $\beta$ but $\beta$ is less than $\beta 1$. With this arrangement, $\beta$ is never less than $\beta 1$ even when the good receiving Condition is continued, and therefore a time required until the diversity reception is started can be shortened when the receiving condition is deteriorated.

In contrast, in step S15, if C/N is below $\beta$, it is decided whether or not the threshold $\beta$ is more than $\beta 2$ (step S19). If $\beta$ is more than $\beta 2$, $\beta$ is set lower by $\Delta\beta$ (step S20). Then, the single receiving operation is executed (step S18). In contrast, if $\beta$ is below $\beta 2$, the diversity receiving operation is executed (step S21). In this manner, it is set that the diversity receiving operation is executed if C/N is below $\beta$ and $\beta$ is below $\beta 2$, while it is set that $\beta$ is set lower by $\Delta\beta$ and the single receiving operation is executed if C/N is below $\beta$ but $\beta$ is more than $\beta 2$. With this arrangement, $\beta$ never exceeds $\beta 2$ even when the poor receiving condition is continued, and therefore a time required until the single reception is started can be shortened when the receiving condition is improved.

In this manner, according to the diversity receiving device of the present embodiment, it is set that the single receiving operation is executed when C/N is in excess of $\beta$ and $\beta$ is more than $\beta 1$, while it is set that the threshold $\beta$ is set higher by $\Delta\beta$ and the single receiving operation is executed when C/N is in excess of $\beta$ but $\beta$ is less than $\beta 1$. Also, it is set that the diversity receiving operation is executed if C/N is below $\beta$ and $\beta$ is below $\beta 2$, while it is set that $\beta$ is set lower by $\Delta\beta$ and the single receiving operation is executed if C/N is below $\beta$ but $\beta$ is more than $\beta 2$. Therefore a time required until the diversity reception is started can be shortened when the receiving condition is deteriorated, and also a time required until the single reception is started can be shortened when the receiving condition is improved. As a result, a switching time required when the receiving conditions are changed can be shortened, and a power saving can be achieved.

Figure 4:
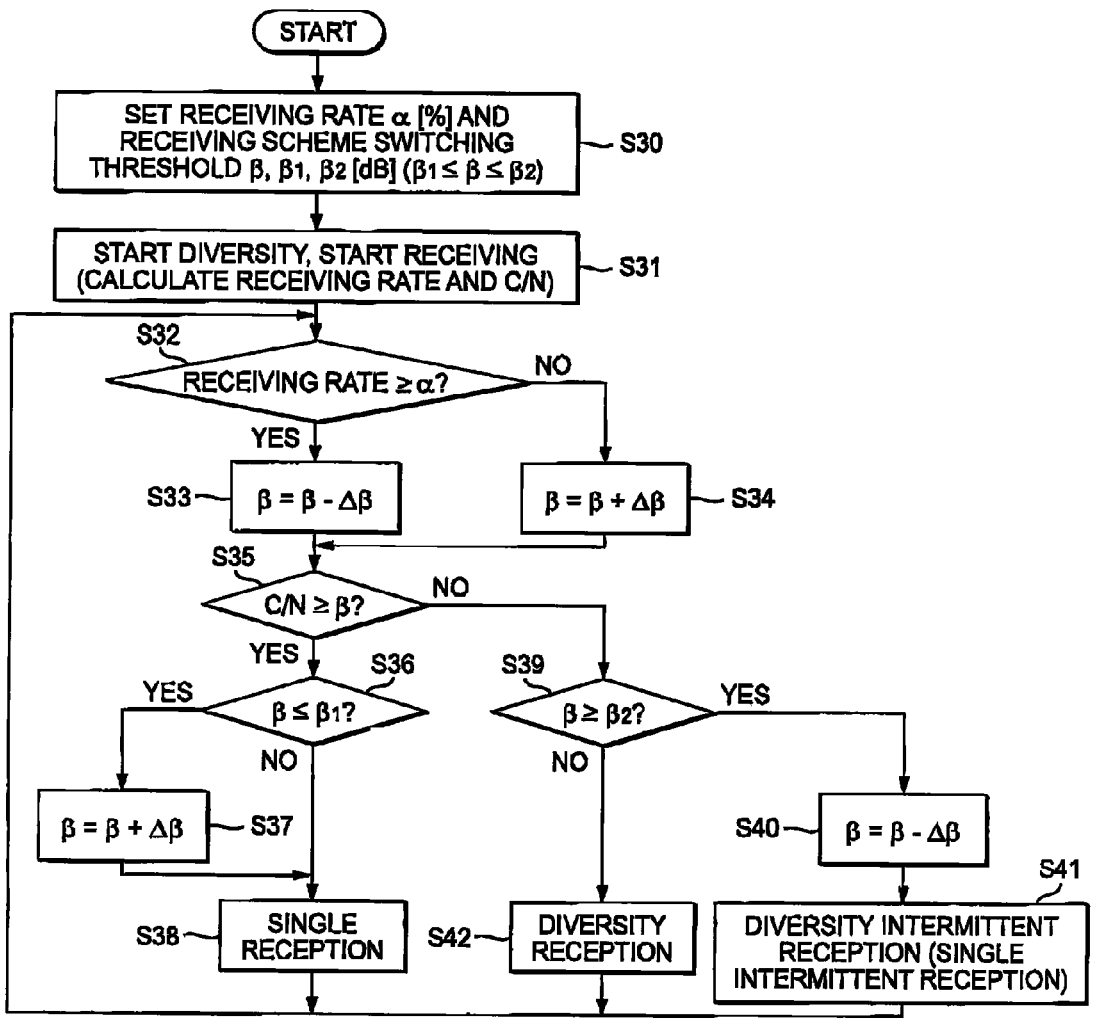
FIG. 4 is a flowchart explaining an operation of a diversity receiving device according to Embodiment 3 of the present invention.
Figure 4:
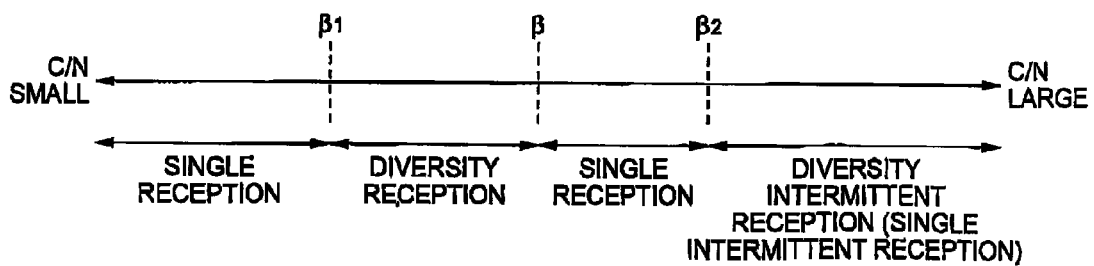

Next, a diversity receiving device according to Embodiment 3 of the present invention will be explained hereunder. The diversity receiving device of the present embodiment is different from Embodiment 2 in that a function of executing the diversity intermittent reception is added. The configuration of the receiver is similar to that in FIG. 1, and therefore its explanation will be omitted herein. An operation of the diversity receiving device of the present embodiment will be explained with reference to a flowchart shown in FIG. 4 and a view showing a relationship between C/N and $\beta$, $\beta 1$, $\beta 2$. Since the setting process of the receiving rate $\alpha$ and the setting process of the receiving scheme switching thresholds $\beta$, $\beta 1$, $\beta 2$ (step S30) are similar to Embodiment 2 and processes of updating the value $\beta$ (step S31 to step S34) are similar to Embodiment 1, their explanation will be omitted herein.

After the receiving scheme switching threshold $\beta$ is updated by setting this value lower or higher by $\Delta\beta$, it is decided whether or not C/N is less than 1, by comparing C/N calculated in step S31 with $\beta$ (step S35). If C/N is in excess of $\beta$, it is decided whether or not, is less than $\beta 1$ (step S36). If $\beta$ is less than $\beta 1$, the threshold $\beta$ is set higher by $\Delta\beta$ (step S37). Then, the single reception is carried out (step S38). In contrast, if $\beta$ is more than $\beta 1$, the single receiving operation is executed as it is (step S38). In this manner, it is set that the single receiving operation is executed when C/N is in excess of $\beta$ and $\beta$ is less than $\beta 1$, while it is set that the threshold $\beta$ is set higher by $\Delta\beta$ and the single receiving operation is executed when C/N is in excess of $\beta$ but $\beta$ is less than $\beta 1$. With this arrangement, β is never less than β1 even when the good receiving condition is continued, and therefore a time required until the diversity reception is started can be shortened when the receiving condition is deteriorated.

In contrast, in step S35, if C/N is below β, it is decided whether or not the threshold β is more than β2 (step S39). if β is more than β2, β is set lower by Δβ (step S40). Then, the diversity intermittent receiving operation is executed (step S41). in contrast, if β is below β2, the diversity receiving operation is executed (step S42). In this manner, it is set that the diversity receiving operation is executed if C/N is below β and β is below β2, while it is set that β is set lower by Δβ and the diversity intermittent receiving operation is executed if C/N is below β but β is more than β2. With this arrangement, the diversity reception is carried out in a state that the receiving conditions are deteriorated, and as a result it can be decided with good precision whether or not the information signal can be received and also a power consumption can be attained by executing the intermittent reception. Here, in step S41, the single intermittent reception may be carried out.

In this manner, according to the diversity receiving device of the present embodiment, it is set that the single receiving operation is executed when C/N is in excess of β and β is less than β1, while it is set that the threshold β. is set higher by Δβ and the single receiving operation is executed when C/N is in excess of β but β is less than β1. Also, it is set that the diversity receiving operation is executed if C/N is below β and β is below β2, while it is set that β is set lower by Δβ and the diversity intermittent receiving operation is executed if C/N is below β but β is more than β2. Therefore, since β is never less than β1 even when the good receiving condition is continued, a, time required until the diversity reception is started can be shortened when the receiving condition is deteriorated. Also, since the diversity reception is carried out in a state that the receiving conditions are deteriorated, it can be decided with good precision whether or not the information signal can be received and also a power consumption can be attained by executing the intermittent reception.

In the above embodiments, the case where the antennas 101, 105, the radio demodulating portions 102, 106, and the decoding portions 103, 107 are equipped as two systems is explained. But the similar advantages can be achieved by the case where two systems or more are installed. In this case, for example, in N-system receiving systems, the diversity reception of (N-1) types can be applied and the diversity reception of (N-1) types can be switched during the diversity reception.

In the above embodiments, a power feeding to both the radio demodulating portion 102 (106) and the decoding portion 103-(107) is stopped during the single reception. But a power feeding to either of the radio demodulating, portion 102 (106) and the decoding portion 103 (107) may be stopped. In this case, it is needless to say that a choice of the constituent portion whose power consumption is larger is advantageous in a viewpoint of a power saving.

The present invention is explained in detail with reference to the particular embodiments as above. But it is apparent for those skilled in the art that various variations and modifications can be applied without departing from a spirit and a scope of the present invention.

INDUSTRIAL APPLICABILITY

The present invention possesses advantages such that a power saving can be achieved and also a time duration of the battery can be prolonged, and is applicable to the diversity receiving device using a plurality of receiving branches, particularly a cellular phone, a car navigation system, or the like, which is capable of receiving the digital terrestrial broadcasting.

The invention claimed is:

1. A diversity receiving device, comprising:
   a plurality of antennas which receives a radio signal respectively;
   a plurality of radio demodulating portions which demodulates each of radio signals received by the plurality of antennas respectively;
   a plurality of decoding portions which decodes output signals from the plurality of radio demodulating portions respectively;
   a synthesizing portion which synthesizes output signals from the plurality of decoding portions;
   a power-supply controlling portion which applies an ON/OFF-control to respective power supplies of the plurality of radio demodulating portions, the plurality of decoding portions, and the synthesizing portion respectively;
   a receiving rate calculating portion which calculates a receiving rate from an output signal of the synthesizing portion;
   a received quality calculating portion which calculates a received quality based on respective output signals of the plurality of decoding portions or the output signal of the synthesizing portion; and
   a receiving scheme switching portion which switches a receiving mode between a single reception and a diversity reception based on a receiving scheme switching threshold, updating the receiving scheme switching threshold based on the receiving rate calculated by the receiving rate calculating portion, switching the receiving mode into the single reception in which one portion of the plurality of antennas, one portion of the plurality of radio demodulating portions, and one portion of the plurality of decoding portions are employed respectively and turning OFF respective power supplies of remaining antennas, remaining radio demodulating portions, and remaining decoding portions when the received quality calculated by the received quality calculating portion exceeds the receiving scheme switching threshold, and switching the receiving mode into the diversity reception in which the plurality of antennas, the plurality of radio demodulating portions, and the plurality of decoding portions are employed respectively when the received quality is below the receiving scheme switching threshold.

2. The diversity receiving device according to claim 1, wherein the receiving scheme switching portion sets the receiving scheme switching threshold smaller by a predetermined value when the receiving rate calculated by the receiving rate calculating portion is equal to or greater than a reference receiving rate set previously, and sets the receiving scheme switching threshold larger by a predetermined value when the receiving rate calculated by the receiving rate calculating portion is smaller than the reference receiving rate.

3. The diversity receiving device according to claim 1, wherein the receiving scheme switching portion has a first predetermined value that is less than the receiving scheme switching threshold and a second predetermined value that is more than the receiving scheme switching threshold; and
   wherein the receiving scheme switching portion sets the receiving scheme switching threshold larger by a predetermined value and switches the receiving mode to the single reception when the received quality calculated by the received quality calculating portion is equal to or greater than the receiving scheme switching threshold and the receiving scheme switching threshold is equal to or smaller than the first predetermined value, switches the receiving mode to the single reception when the received quality calculated by the received quality calculating portion is equal to or greater than the receiving scheme switching threshold and the receiving scheme switching threshold is greater than the first predetermined value, sets the receiving scheme switching threshold smaller by the predetermined value and switches the receiving mode to the single reception when the received quality calculated by the received quality calculating portion is smaller than the receiving scheme switching threshold and the receiving scheme switching threshold is equal to or greater than the second predetermined value, and switches the receiving mode to the diversity reception when the received quality calculated by the received quality calculating portion is smaller than the receiving scheme switching threshold and the receiving scheme switching threshold is smaller than the second predetermined value.

4. The diversity receiving device according to claim 1, wherein the receiving scheme switching portion has a first predetermined value that is less than the receiving scheme switching threshold and a second predetermined value that is more than the receiving scheme switching threshold; and wherein the receiving scheme switching portion sets the receiving scheme switching threshold larger by a predetermined value and switches the receiving mode to the single reception when the received quality calculated by the received quality calculating portion is equal to or greater than the receiving scheme switching threshold and the receiving scheme switching threshold is equal to or smaller than the first predetermined value, and sets the receiving scheme switching threshold smaller by the predetermined value and switches the receiving mode to either the diversity reception to execute a diversity intermittent reception such that the diversity reception is executed only at a predetermined time interval or the single reception to execute a single intermittent reception such that the single reception is executed only at the predetermined time interval when the received quality calculated by the received quality calculating portion is smaller than the receiving scheme switching threshold and the receiving scheme switching threshold is equal to or greater than the second predetermined value.

5. The diversity receiving device according to claim 1, wherein the received quality calculating portion calculates C/N as a power ratio of a signal to a noise or a received field strength as the received quality.

6. A mobile terminal equipped with the diversity receiving device set forth in claim 1.

7. A receiving scheme switching method of executing a switching between a single reception and a diversity reception in a diversity receiving device which includes
a plurality of antennas which receives a radio signal respectively,
a plurality of radio demodulating portions which demodulates each of radio signals received by the plurality of antennas respectively,
a plurality of decoding portions which decodes output signals from the plurality of radio demodulating portions,
a synthesizing portion which synthesizes output signals from the plurality of decoding portions,
a power-supply controlling portion which applies an ON/OFF-control to respective power supplies of the plurality of radio demodulating portions, the plurality of decoding portions, and the synthesizing portion respectively,
a receiving rate calculating portion which calculates a receiving rate from an output signal of the synthesizing portion, and
a received quality calculating portion which calculates a received quality based on respective output signals of the plurality of decoding portions or the output signal of the synthesizing portion,
the switching method, comprising:
switching a receiving mode between the single reception and the diversity reception based on a receiving scheme switching threshold;
updating the receiving scheme switching threshold based on the receiving rate calculated by the receiving rate calculating portion;
switching the receiving mode into the single reception in which one portion of the plurality of antennas, one portion of the plurality of radio demodulating portions, and one portion of the plurality of decoding portions are employed respectively and turning OFF respective power supplies of remaining antennas, remaining radio demodulating portions, and remaining decoding portions when the received quality calculated by the received quality calculating portion is equal to or greater than the receiving scheme switching threshold; and
switching the receiving mode into the diversity reception in which the plurality of antennas, the plurality of radio demodulating portions, and the plurality of decoding portions are employed respectively when the received quality is smaller than the receiving scheme switching threshold.

* * * * *

UNITED STATES PATENT AND TRADEMARK OFFICE
CERTIFICATE OF CORRECTION

| | | |
|---|---|---|
| PATENT NO. | : 8,000,673 B2 | |
| APPLICATION NO. | : 12/295200 | |
| DATED | : August 16, 2011 | |
| INVENTOR(S) | : Makoto Sasaki et al. | |

It is certified that error appears in the above-identified patent and that said Letters Patent is hereby corrected as shown below:

- In column 5, line 42 please delete "1091" and insert --109--.

- In column 7, line 63 please delete "13" and insert --β--.

- In column 8, line 57 please delete "1" and insert --β--.

- In column 9, line 6, the letter "i" in word "if" should be uppercase.

- In column 9, line 33, please delete the "," between "a" and "time".

Signed and Sealed this
Thirty-first Day of January, 2012

David J. Kappos
*Director of the United States Patent and Trademark Office*